(12) United States Patent
Poisel et al.

(10) Patent No.: US 9,291,777 B2
(45) Date of Patent: Mar. 22, 2016

(54) OPTICAL ROTARY TRANSMITTER

(75) Inventors: Hans Poisel, Leinburg (DE); Martin Bloos, Nürnberg (DE); Olaf Ziemann, Nürnberg (DE)

(73) Assignee: Technische Hochschule Georg Simon Ohm, Nuremberg (DE)

(*) Notice: Subject to any disclaimer, the term of this patent is extended or adjusted under 35 U.S.C. 154(b) by 479 days.

(21) Appl. No.: 13/695,819

(22) PCT Filed: Apr. 21, 2011

(86) PCT No.: PCT/EP2011/002057
§ 371 (c)(1),
(2), (4) Date: Jan. 8, 2013

(87) PCT Pub. No.: WO2011/137983
PCT Pub. Date: Nov. 10, 2011

(65) Prior Publication Data
US 2013/0243375 A1  Sep. 19, 2013

(30) Foreign Application Priority Data

May 4, 2010 (DE) .......................... 10 2010 016 773
Sep. 2, 2010 (DE) .......................... 10 2010 036 174

(51) Int. Cl.
G02B 6/36 (2006.01)
G02B 6/32 (2006.01)

(52) U.S. Cl.
CPC ................ G02B 6/36 (2013.01); G02B 6/3604 (2013.01); *G02B 6/32* (2013.01)

(58) Field of Classification Search
CPC ...................................................... G02B 6/3604
See application file for complete search history.

(56) References Cited

U.S. PATENT DOCUMENTS

| | | | |
|---|---|---|---|
| 4,027,945 A | 6/1977 | Iverson | |
| 4,943,137 A | 7/1990 | Speer | |
| 4,953,932 A | 9/1990 | Mihich | |
| 6,128,426 A | 10/2000 | Einhorn | |
| 6,289,152 B1 | 9/2001 | Zhang et al. | |
| 7,724,996 B2 * | 5/2010 | Popp et al. | 385/33 |
| 2003/0210859 A1 | 11/2003 | Mercey et al. | |

FOREIGN PATENT DOCUMENTS

| DE | 60314028 | 1/2008 |
|---|---|---|
| DE | 102006054052 | 5/2008 |

(Continued)

OTHER PUBLICATIONS

International Search Report (11 pages) for International Application No. PCT/EP2011/002057, mailing date Nov. 15, 2012.

*Primary Examiner* — Ryan Lepisto
*Assistant Examiner* — Erin Chiem
(74) *Attorney, Agent, or Firm* — Tarolli, Sundheim, Covell & Tummino LLP

(57) ABSTRACT

An optical rotary transmitter which ensures the reliable transmission of optical signals in conjunction with a comparatively simple construction comprises two parts spaced apart from one another which are rotatable relative to one another about a common centre axis and the first of which comprises a first circular light coupler (10) and the second of which comprises a second circular light coupler (20). The light entrance and light exit surfaces of the two light couplers face one another. Each of the light couplers (10, 20) consists of collimators (11, 21) combined to form a respective collimator arrangement (16, 26), optical coupling elements (15, 25) being connected to said collimators.

5 Claims, 4 Drawing Sheets

(56) References Cited

FOREIGN PATENT DOCUMENTS

| | | |
|---|---|---|
| DE | 102008030187 | 7/2010 |
| EP | 0215973 | 4/1987 |
| GB | 2247089 | 2/1992 |
| JP | 59-017526 | 1/1984 |
| JP | 62028704 | 2/1987 |
| JP | 4195106 | 7/1992 |
| WO | WO 00/25162 | 5/2000 |

* cited by examiner

OPTICAL ROTARY TRANSMITTER

CROSS REFERENCES TO RELATED APPLICATIONS

The present application is a 35 U.S.C. § 371 National Stage Patent Application of International PCT Application Serial Number PCT/EP2011/02057 having an International filing date of 21 Apr. 2011, which claims priority to German Patent Application Serial No. 102010016773.8 that was filed on 4 May 2010 and German Patent Application Serial No. 102010036174.7 that was filed on 2 Sep. 2010. This Application claims priority to and incorporates by reference the above applications in their entirety for all purposes.

BACKGROUND

The invention relates to an optical rotary transmitter having the features of the preamble of claim 1. Such a rotary transmitter may be part of a rotary coupling, for example, or some other device having rotationally movable parts spaced a distance apart from one another and permits unidirectional or bidirectional transmission of optical signals between parts that are rotatable relative to one another independently of their rotational position and angular velocity. The wavelength range may extend from long-wavelength IR radiation to short-wavelength UV radiation. The terms "light" and "optical" are to be understood in this sense below.

Such optical rotary transmitters are known from DE 603 14 028 T2 and GB 2 247 089 A. They permit high signal transmission reliability, regardless of the angular velocity of the parts that are rotatable in relation to one another, and use commercial semiconductor transmitter and receiver bit rates of up to 10 Gbit/s. However, multichannel operation is possible only when using time multiplex methods or wavelength multiplex methods.

JP 62-028704 A discloses an optical rotary transmitter having two parts that are spaced a distance apart from one another and rotate relative to one another about a common central axis, the first part of which has collimators arranged tightly in a circle around this central axis and the second part has second collimators that are spaced further apart radially from this central axis, the parallel beam bundles being focused on the first collimators by a Fresnel lens.

JP59-017526 A discloses a scanner for rotary scanning of the beam exit surfaces of waveguide fibers arranged on the circumference of a circle. This purpose is served by another waveguide fiber having a longitudinal axis running through the midpoint of the circle, rotating about same and having an end bent at an angle by the amount of the midpoint distance of the beam exit surfaces of the first waveguide fibers.

US-A-4 943 137 discloses a rotary transmitter whose light is directed by an optical transmitter, which is assigned to one of the two parts that is rotatable in relation to the others, via optical fibers and collimators to an optical coupling module and from there further to an optical receiver, which is assigned to the other rotatable part. The coupling module serves the purpose of derotation of the light, so it rotates at half the angular velocity of the two parts that are rotatable in relation to one another. Consequently, this design is very complex.

US-A-4 027 945 discloses a rotary transmitter, in which the optical signals of a transmitter assigned to the first of the parts rotatable in relation to one another are fed into a fiber bundle. This fiber bundle is arranged in a circle about the axis rotation; likewise a similar fiber bundle is arranged on the second part which includes an optical receiver. This requires a large number of optical fibers, i.e., waveguide fibers.

AS-4-6 128 426 describes a rotary transmitter in which light from an optical transmitter, for example, which rotates together with the first part, is transmitted to a plurality of optical receivers or detectors arranged in a circle on the second part. This rotary transmission requires angle decoding of the relative positions of the rotary parts to one another.

DE-A-10 2008 030 187 describes a rotary transmitter in which an optical transmitter assigned to the first part feeds optical signals into a waveguide on the second part. The waveguide therefore has a specially processed surface, which permits this light signal feed. Such waveguides are not available commercially and are therefore expensive.

DE-A-10 2006 054 052 describes a rotary transmitter having two light-conducting hollow bodies coaxial with one another into which light signals from a transmitter are fed by means of waveguides distributed around the circumference of the one hollow body, the signals being emitted through the end face thereof in the direction of the end face of the other hollow body and output by the same principle via waveguides of the other part and sent to a receiver. With this design, there is high signal attenuation due to uniform distribution of the signals over the entire circumference of the hollow bodies.

BRIEF SUMMARY OF THE INVENTION

The object of the invention is to make available a rotary transmitter that will ensure reliable transmission of optical signals in physically separate channels between the parts that are rotatable in relation to one another, and doing so with a comparatively simple design.

This object is achieved according to the present invention by the fact that at least one additional optical coupling element is coupled to each collimator in such a way that the collimator generates an additional parallel beam bundle, which is assigned to this second coupling element and forms an angle with a parallel beam bundle corresponding to the first optical element.

This rotary transmitter may operate unidirectionally or bidirectionally. The terms "send" and "receive" as used below are therefore interchangeable.

Due to its simple and largely symmetrical design, the rotary transmitter can be manufactured inexpensively while at the same time ensuring a high signal transmission reliability that does not depend on the angular velocity of the parts that are rotatable relative to one another. Depending on the dimensions of the collimators, distances on the order of up to 100 mm can be bridged between the light couplers.

The angle between these parallel beam bundles must expediently be such that the parallel beam bundles of each collimator of the one light coupler corresponding to the different optical coupling elements strike neighboring collimators of the opposing light coupler.

Each collimator may consist of at least one (focusing) lens followed by at least one light guide and connecting devices for optical coupling elements. More complex designs for adjusting the numeric apertures and/or the diameters of the lens and of the optical coupling element, e.g., successive concentration stages, are also possible. Depending on the specific application, conventional spherical lenses made of glass or plastic, GRIN lenses, Fresnel lenses or other special shapes may be used in one or more stages.

The collimators of each collimator arrangement are preferably arranged adjacent to one another with essentially no gap. "With essentially no gap" means that collimators mounted in mechanical holders cannot be installed with their optically active surfaces directly abutting against one another.

The optical coupling elements preferably consist of waveguides in the form of waveguide fibers, which are expediently combined to form a bundle at their input and/or output ends. One of the conventional optical semiconductor transmitters and/or receivers may be coupled to the input and/or output end either directly or by way of concentrator.

An alternative design, although more complex, has each waveguide fiber ending in a transmission and/or reception element assigned to it. In this case, all the transmission elements must be triggered in parallel, and the reception signals must be sent together to the reception elements. The higher light transmission power improves the signal-to-noise ratio on the reception end.

When using just one transmission and/or reception element shared by all the optical coupling elements in the form of waveguide fibers, it may be expedient toward the goal of achieving a uniform distribution of signals over the circumferences of the respective circles if the waveguide fibers of each collimator arrangement are guided jointly to a shared light mixer.

For their part, the light mixers may he optical waveguides to which the respective light transmitter and/or light receiver is then connected, optionally by way of a concentrator.

In addition, the light mixers may at the same time adjust the numeric aperture and/or the cross section of the light transmitters and/or light receivers to those of the optical coupling elements, e.g., the waveguide fibers.

In the normal case, the collimators are designed so that their transmission and/or reception characteristics correspond essentially to those of a parallel beam bundle. One embodiment of the rotary transmitter, which makes it possible to bridge a different diameter of the first light coupler and of the second light coupler, which is due to the further design of the rotary transmitter and thus of the first collimator arrangement and of the second collimator arrangement, consists of the fact that the optical axes of opposite collimators of the first collimator arrangement and of the second collimator arrangement are aligned with one another but form an angle with the shared central axis.

If the parts of the rotary transmitter are arranged coaxially and concentrically with one another, i.e., if they consist of two coaxial hollow shafts, for example, then it is also possible to have an embodiment in which the first light coupler and the second coupler are arranged concentrically around one another and the respective essentially parallel beam bundles of their collimators run at least approximately orthogonally to the shared central axis, i.e., radially to it.

Another embodiment of the rotary transmitter consists of the fact that the first light coupler and the second light coupler each comprise at least one additional collimator arrangement in which the collimators are arranged on a circle that is concentric with the circle of the first collimator arrangement and has a diameter different from the diameter of the first circle. In other words, when there are two concentric collimator arrangements per light coupler, multiple first signal channels can be guided over the first collimator arrangement and multiple second signal channels can be guided over the second collimator arrangement without having to use a multiplex method.

Another embodiment of the rotary transmitter consists of the fact that the first light coupler and the second light coupler each comprise at least one additional collimator arrangement in which the collimators are arranged on a circle that is concentric with the circle of the first collimator arrangement and has a diameter different from the diameter of the first circle. In other words, when there are two concentric collimator arrangements per light coupler, multiple first signal channels can be guided over the first collimator arrangement and multiple second signal channels can be guided over the second collimator arrangement without having to use a multiplex method.

An improved coupling between the first and second light coupler through a more uniform distribution of the reception radiation over the circular ring on which the collimators are arranged is achieved if the number of collimators of the first light coupler is different, in particular different by one, from the number of collimators of the second light coupler.

BRIEF DESCRIPTION OF THE SEVERAL VIEWS OF THE DRAWINGS

The present invention is explained below with reference to the drawings, in which simplified exemplary embodiments of the essential parts of the rotary transmitter are shown schematically namely.

DETAILED DESCRIPTION OF THE INVENTION

Figure 1:
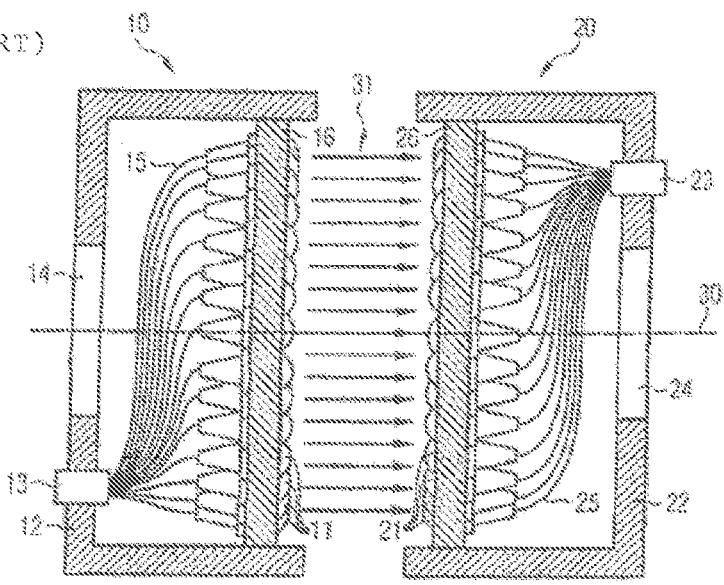
FIG. 1 shows an optical rotary transmitter according to the prior art.
Figure 2:
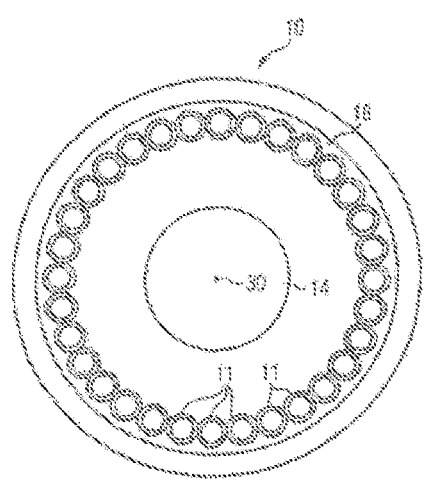
FIG. 2 shows a top view of the optical rotary transmitter's first light coupler.

FIG. 1 shows the essential part of fundamentally any rotator transmitter. It includes a first light coupler 10 and a second light coupler 20. The two light couplers 10, 20 are arranged opposite one another. The first light coupler 10 is assigned to a first part (now shown) of the rotary transmitter, while the second light coupler 20 is assigned to a second part of this rotary transmitter, which can rotate about a shared central axis 30 in relation to the first part. The first light coupler 10 comprises a first collimator arrangement 16 in a housing 12. Similarly, the second light coupler 20 comprises a second collimator arrangement 26 in a housing 22. The first collimator arrangement 16 consists of collimators 11 distributed uniformly and adjacent to one another on the circumference of a circle. The second collimator arrangement 26 consists of similarly arranged collimators 21. The collimators send and receive light essentially in parallel with the shared central axis 30, which is also the axis of rotation at the same time. The direction of the beam is merely indicated as an example in FIG. 1 through the individual arrows labeled as 31 on the whole; in this case, the light coupler 10 is the transmitting light coupler and the light coupler 20 is the receiving light coupler. This relationship is of course reciprocal. One waveguide fiber 15 is connected to each light coupler 11 and one waveguide fiber 25 is connected to each light coupler 21, The waveguide fibers 15, 25 are each combined into a bundle and end in a block 13 or 23, respectively. The blocks 13 and 23 may stand for a light transmitter, e.g., a VCSEL, and a light receiver, e.g., a PIN diode. Instead of that, the blocks 13, 23 may also be components between a light transmitter and/or a light receiver and the respective waveguide fiber bundle, e.g., light mixers in the form of an optical waveguide that distributes the transmitted light signal over the waveguide fibers 15 as uniformly as possible to all collimators 11 and combines the light signals received by the collimators 21 and couples them to the light receiver. The light mixers are therefore also designed so that they adjust the numeric aperture and/or the cross section of the light transmitter and/or the light receiver to that of the waveguide fibers 15 and 25, respectively.

The collimators 11 and/or 21 are designed so that they convert the light signal input via the respective waveguide fiber into a parallel beam bundle an/or they feed the received parallel beam bundle into the connected waveguide fiber.

The circular or annular shape of the collimator arrangements 16 and/or 25 exposes an internal diameter of the light couplers 10 and/or 20, so that other parts of the rotary transmitter that are not shown here, e.g., a drive shaft, can be passed through boreholes 14, 24, for example, or rotary bearings (not shown here) can be arranged in the boreholes 14, 24.

Figure 3:
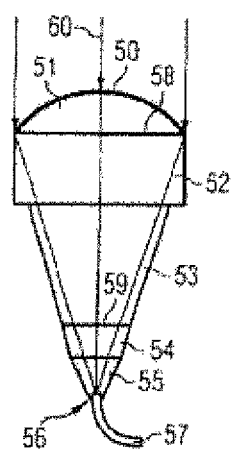
FIG. 3 shows an exemplary embodiment of a collimator.

FIG. 3 illustrates the design of a collimator for a rotary transmitter according to the invention merely as an example, but this shows only a centrally connected waveguide fiber.

The collimator comprises a lens 51 through whose imaging surface 50 a parallel beam bundle 60 arrives. The lens is mounted in a holder 52. A conical body 53 for guiding the light in the direction of a surface 59 comes after the lens 51 and is in turn followed by the optical concentrators 54, 55, which adjust the diameter and the aperture of the light bundle to the input diameter and the aperture of a waveguide fiber 57. The waveguide fiber 57 is connected to the collimator, preferably directly i.e., without an air interspace by means of an essentially known connection device (not shown here) in the form of a connection and coupling site 56.

Figure 4:
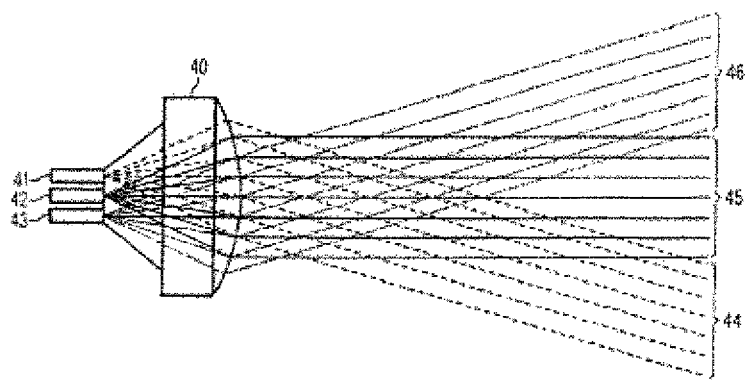
FIG. 4 shows a side view of a collimator in a three-channel embodiment.

FIG. 4 Shows a collimator 40 to which a waveguide fiber 42 is connected centrally and waveguide fibers 41, 43 are connected eccentrically on both sides. The collimator 40 generates (or receives) three beam bundles 44, 45, 46 accordingly, as are shown in idealized form, but are also assigned individually to the waveguide fibers 41, 42, 43 in the real beam path, namely beam bundle 44 being assigned to waveguide fiber 42 and the beam bundle 46 being assigned to the waveguide fiber 43. Therefore, the waveguide fibers 41, 42, 43 can be operated as independent signal channels. The waveguide fibers 41, 42, 43 are coupled locally to the collimator 40, so that the beam bundles 44, 45, 46 strike different but neighboring collimators on the opposite side.

Figure 5:
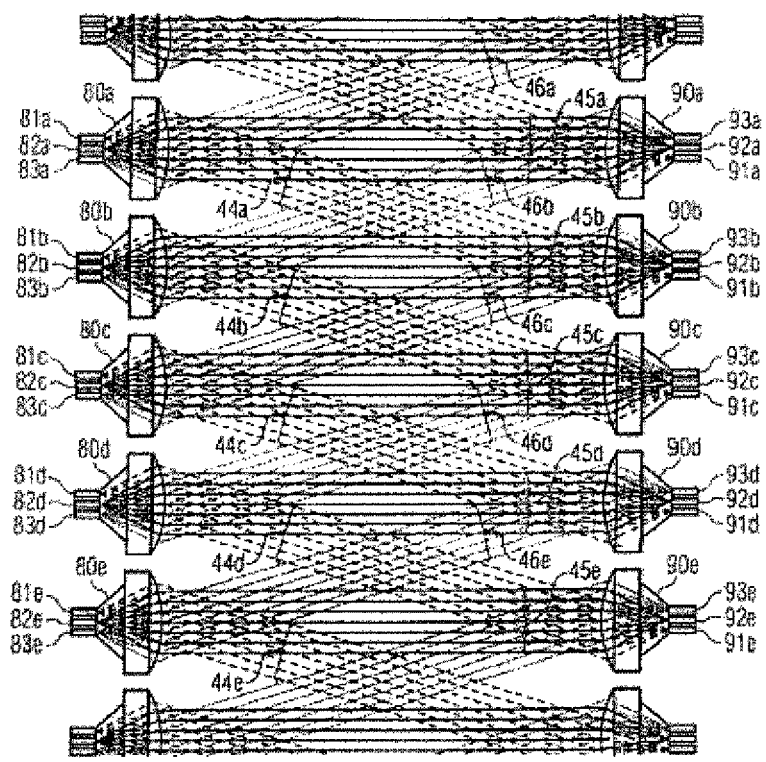
FIG. 5 shows multiple collimators according to FIG. 4 and the respective beam paths.
Figure 6:
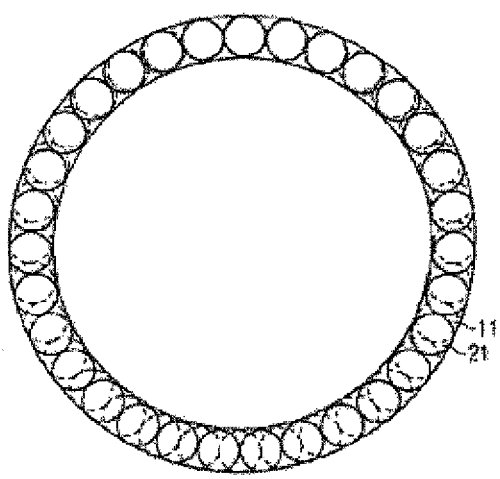
FIG. 6 shows a top view of two collimator arrangements projected one above the other with a different number of collimators by one.

This is diagrammed schematically in FIG. 5 in the form of a partial developed view of the opposite collimator arrangements. Collimators 80a through 80e are illustrated are illustrated on the left side like FIG. 4 with first waveguides 81a to 81e, second waveguides 82a to 82e, third waveguides 83a to 83e and the respective beam paths 44a to 44e, 45a to 45e and 46a to 46e. These are opposite the collimators 90a to 90e with the first waveguides 91a to 91e, the second waveguides 92a to 92e and the third waveguides 93a to 93e, namely on the right side of the drawing here. Light from the first eccentrically coupled waveguides 81a, b, c, d is guided through the collimators 80a, b, c, d via the beam bundles 44a, b, c, d through the collimators 90b, c, d, e and into the waveguides 91b, c, d, e. Likewise, light from the first centrally coupled waveguides 82a, b, c, d, e is guided through the collimators 80a, b, c, d, e via the beam bundle 45a, b, c, d and through the collimators 90a, b, c, d, e into the waveguides 92a, b, c, d, e. Accordingly, light from the first waveguides 83b, c, d, e is guided through the collimators 80b, c, d, e, via the beam bundles 46b, c, d, e and the collimators 90a, b, c, d into the waveguides 93a, b, c, d. Thus light is always being transmitted from the waveguides 81 to the waveguides 91, from the waveguides 82 to the waveguides and from the waveguides 83 to the waveguides 93. Each of these waveguides pairs may be used as a separate optical signal channel that is decoupled from the other channels, apart from diffraction-related scattered light in particular. FIG. 6 shows schematically the collimators 11 of the first collimator arrangement illustrated one above the other and the collimators 21 of the second collimator arrangement in one embodiment, in which the second collimator arrangement has one less collimator than the first collimator arrangement.

The first collimator arrangement here has thirty-two collimators 11, which the second collimator arrangement has thirty-one collimators 21, resulting in a uniformly progressive coverage of the collimators during the rotational movement of the respective parts of the rotary transmitter, for example, of the second collimator arrangement, by the beam bundles created by the collimators of the first collimator arrangement and vice-versa in the reciprocal case. Consequently, the optical attenuation is averaged over the entire annular arrangement of the collimators. Even if the respective parts of the rotary transmitter are stationary in some cases at different rotational angle positions in relation to one another, this ensures a largely angle-independent transmission and/or signal strength.

Exemplary Embodiment

A VCSEL with a wavelength of 850 nm is used as the transmitter.

The output fiber bundle consists of 61 fibers with as fiber diameter of 125 μm; the diameter of the bundle is 1.125 mm.

The numeric aperture of the fibers is 0.20.

The lenses are 2.5;2.5 mm in size. The numeric aperture is reduced to 0.01.

The diameter of the collimator rings is approximately 50 mm.

If a beam widening of mm is allowed, the distance between the transmitter and receiver collimator rings may be as to 10 cm.

A Si-PIN diode with a 1.2 mm diameter is used as the photodiode, so a bit rate of up to 1 Gbit/s is possible.

Alternatively, a concentrator is used so that the photodiode diameter can be reduced to 300 μm, thereby achieving bit rates of up to 10 Gbit/s.

Figure 7:
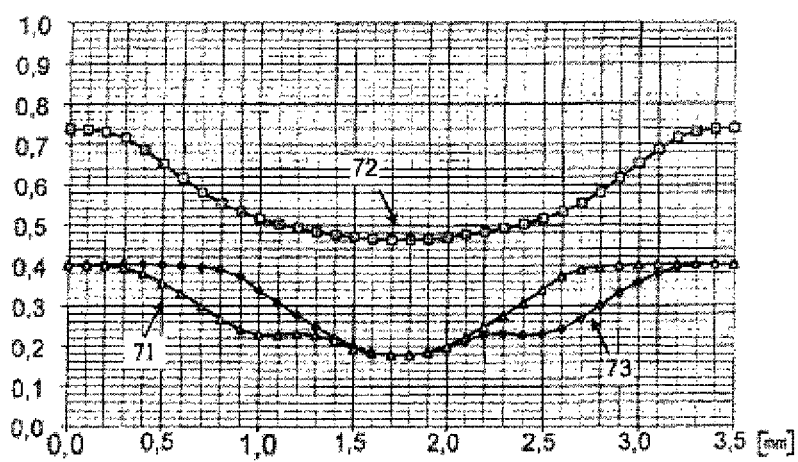
FIG. 7 shows a diagram of the coupling efficiency in a three-channel embodiment of the rotary transmitter according to FIG. 5.

FIG. 7 shows the coupling efficiency of a rotary transmitter having three channels according to FIG. 5, starting from as center-to-center spacing of the collimators of 3.5 mm. The lateral shift in the collimators 80 with respect to the collimators 90 is plotted in mm on the abscissa. The received signal power standardized to as value of 1.0 is plotted on the ordinate. For example, collimators 80a and 90a are exactly opposite one another at the zero point. Then the collimators 80a and 90b are exactly opposite one another at the end abscissa value of 3.5 mm, i.e., after rotation of the one collimator arrangement relative to the other collimator arrangement by one increment corresponding to an arc of 3.5 mm.

Curve 71 shows the attenuation curve of the added signals that are received, for example, by the optical fibers 91 starting from the waveguides 81. The curve 72 shows the attenuation curve of the added signals of the waveguides 92 received by the waveguides 82. The curve 73 shows the corresponding attenuation between the waveguides 93 and 83. In other words, the curve 72 shows the attenuation of the total signal transmitted over the central light bundle, while curves 71 and 73 illustrate the corresponding attenuations of the total signals of the neighboring "eccentric" light bundles, similar to the diagram in FIG. 4.

A coupling attenuation of 2.4 dB has been ascertained for the signal of the central beam bundles and channels, and a coupling attention of 5.1 dB has been found for the signals of the outer channels.

The invention claimed is:

1. An optical rotary transmitter having two parts spaced a distance apart from one another that are rotatable about a shared central axis in relation to one another, the first one of which has a first circular light coupler (10) and the second one of which comprises a second circular light coupler (20), their light entrance/exit surfaces facing one another and each of the light couplers (10, 20) consisting of collimators combined into a collimator arrangement (16, 26) to which optical coupling elements are connected and send and receive parallel beam bundles, characterized in that at least one additional optical coupling element (e.g., 41, 43) is coupled to each collimator (40) so that the collimator (40) generates an additional parallel beam bundle assigned to this second coupling element, said beam bundle forming an angle with a parallel beam bundle (44, 45, 46) corresponding to the first optical coupling element (e.g., 42), the optical rotary transmitter characterized in that the circles on which the collimators (11, 21) of the first collimator arrangement (16) and the second collimator arrangement (26) are situated have different diameters, and the optical axes of opposite collimators of the first collimator arrangement (16) and of the second collimator arrangement (26) are aligned with one another and form an angle with the shared central axis of the two collimator arrangements (16, 26).

2. An optical rotary transmitter having two parts spaced a distance apart from one another that are rotatable about a shared central axis in relation to one another, the first one of which has a first circular light coupler (10) and the second one of which comprises a second circular light coupler (20), their light entrance/exit surfaces facing one another and each of the light couplers (10, 20) consisting of collimators combined into a collimator arrangement (16, 26) to which optical coupling elements are connected and send and receive parallel beam bundles, characterized in that at least one additional optical coupling element (e.g., 41, 43) is coupled to each collimator (40) so that the collimator (40) generates an additional parallel beam bundle assigned to this second coupling element, said beam bundle forming an angle with a parallel beam bundle (44, 45, 46) corresponding to the first optical coupling element (e.g., 42), the optical rotary transmitter characterized in that the first light coupler and the second light coupler are arranged coaxially with their shared central axis, and their collimators each generate parallel beam bundles that run at least approximately orthogonally to the shared central axis.

3. An optical rotary transmitter having two parts spaced a distance apart from one another that are rotatable about a shared central axis in relation to one another, the first one of which has a first circular light coupler (10) and the second one of which comprises a second circular light coupler (20), their light entrance/exit surfaces facing one another and each of the light couplers (10, 20) consisting of collimators combined into a collimator arrangement (16, 26) to which optical coupling elements are connected and send and receive parallel beam bundles, characterized in that at least one additional optical coupling element (e.g., 41, 43) is coupled to each collimator (40) so that the collimator (40) generates an additional parallel beam bundle assigned to this second coupling element, said beam bundle forming an angle with a parallel beam bundle (44, 45, 46) corresponding to the first optical coupling element (e.g., 42), the optical rotary transmitter characterized in that the first light coupler (10) and the second light coupler (20) each comprise at least one additional collimator arrangement, in which the collimators are arranged on a circle that is concentric with the circle of the first collimator arrangement and has a diameter different from the diameter of the first circle.

4. An optical rotary transmitter having two parts spaced a distance apart from one another that are rotatable about a shared central axis in relation to one another, the first one of which has a first circular light coupler (10) and the second one of which comprises a second circular light coupler (20), their light entrance/exit surfaces facing one another and each of the light couplers (10, 20) consisting of collimators combined into a collimator arrangement (16, 26) to which optical coupling elements are connected and send and receive parallel beam bundles, characterized in that at least one additional optical coupling element (e.g., 41, 43) is coupled to each collimator (40) so that the collimator (40) generates an additional parallel beam bundle assigned to this second coupling element, said beam bundle forming an angle with a parallel beam bundle (44, 45, 46) corresponding to the first optical coupling element (e.g., 42), the optical rotary transmitter characterized in that the number of collimators of the first light coupler (10) is different from the number of collimators of the second light coupler (20).

5. The rotary transmitter according to claim 4, characterized in that the number of collimators of the first light coupler (10) and that of the second light coupler (20) are different by one.

* * * * *